R. BROWN.
Elastic Shafting.

No. 108,323. Patented Oct. 18, 1870.

Witnesses:
A. W. Almqvist
L. S. Mabee

Inventor:
R. Brown
per Munn & Co.
Attorneys.

United States Patent Office.

ROBERT BROWN, OF DETROIT, MICHIGAN.

Letters Patent No. 108,323, dated October 18, 1870.

IMPROVEMENT IN ELASTIC SHAFTING.

The Schedule referred to in these Letters Patent and making part of the same

*To all whom it may concern:*

Be it known that I, ROBERT BROWN, of Detroit, in the county of Wayne and State of Michigan, have invented a new and useful Improvement in Elastic Shafting; and I do hereby declare that the following is a full, clear, and exact description thereof, which will enable others skilled in the art to make and use the same, reference being had to the accompanying drawing forming part of this specification.

Similar letters of reference indicate corresponding parts.

The object of my invention is improvement in arrangements for preventing "back-lash" in gearing, wherein the wheels are connected with their shafts by means of springs; and The improvement consists in the construction and arrangement of parts, as hereinafter specified.

A represents a shaft, and

B is a bevel-gear wheel connected with it.

The gear-wheel B is securely bolted to the hollow cylinder C.

Figure 1:
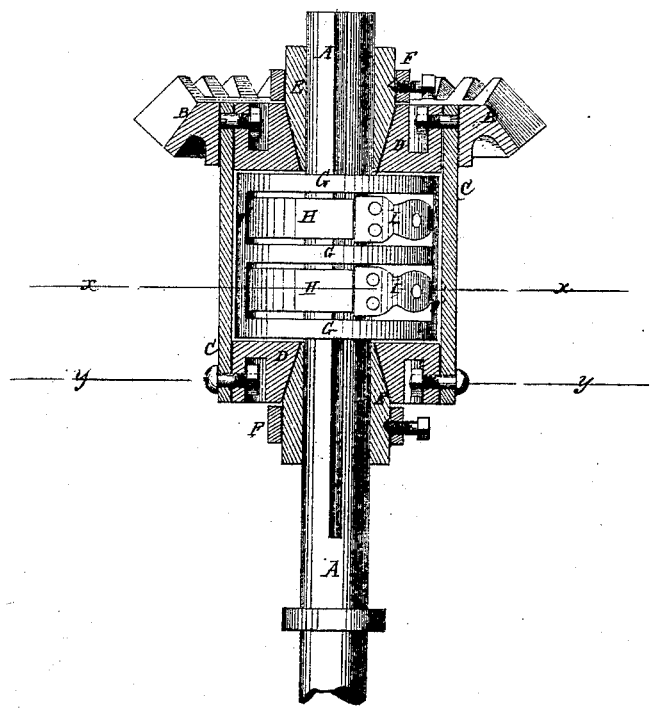
Figure 1 is a side view of my improved shafting, partly in section, to show the construction.

D are two rings, placed in and securely bolted to the ends of the hollow cylinder C, said rings having a circular recess formed upon their outer sides, as shown in fig. 1, to receive the nuts of the bolts, by which the said rings are secured to the said cylinder.

Through the centers of the rings D are formed conical holes, through which the shaft A passes, said holes tapering gradually from the outer to the inner sides of said rings, as shown in fig. 1.

E are conical bearings, which fit into the conical holes of the rings D, and which are keyed to the said shaft A.

Upon the outer cylindrical parts of the bearings E are placed rings F, which rest against the outer sides of the rings D, and are secured to the bearings E by set-screws.

G are three disks, connected to each other upon the opposite sides of the shaft A, by partitions g', formed solid with said disks, thus forming a chambered or recessed cylinder, which is securely keyed to the shaft A.

In the chambers or spaces between the disks G are placed blocks of rubber H, the ends of which rest squarely against the partitions g'.

Figure 2:
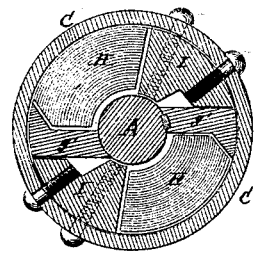
Figure 2 is a detail cross-section of the same, taken through the line x x, fig. 1.
Figure 3:
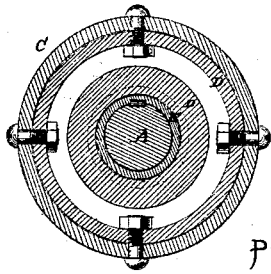
Figure 3 is a detail sectional view of the same, taken through the line y y, fig. 1.

Between the other ends of the blocks H and the other sides of the partitions g' are placed segmental metallic blocks I, which are screwed to the hollow cylinder C, as shown in figs. 1 and 2.

By this construction, when power or resistance is applied to the shaft, the first effect will be to compress the rubber blocks H, thus relieving the teeth of the gearing from the sudden shocks.

Having thus described my invention,

I claim as new and desire to secure by Letters Patent—

The combination, with the shaft A and gear-wheel B, of the hollow cylinder C, rings D D, secured to the cylinder by means of screw-bolts, conical bearings E E, bands F, with their clamp-screws, inner chambered cylinder G g', rubber blocks H H, and metallic blocks I, each of said parts being constructed and all relatively arranged as shown and described.

ROBERT BROWN.

Witnesses:
E. A. ELLIOTT,
ANDREW STEWART.